(12) United States Patent
Olsen et al.

(10) Patent No.: US 10,317,241 B2
(45) Date of Patent: Jun. 11, 2019

(54) SYSTEMS AND METHODS FOR RECOGNIZING AND MEASURING HARD-TO-REACH DESTINATIONS

(71) Applicant: Bayerische Motoren Werke Aktiengesellschaft, Munich (DE)

(72) Inventors: Jesper Olsen, Chicago, IL (US); Jilei Tian, Chicago, IL (US)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 104 days.

(21) Appl. No.: 15/413,116

(22) Filed: Jan. 23, 2017

(65) Prior Publication Data
US 2018/0209811 A1     Jul. 26, 2018

(51) Int. Cl.
*G01C 21/34* (2006.01)
*G01C 21/36* (2006.01)

(52) U.S. Cl.
CPC ..... *G01C 21/3697* (2013.01); *G01C 21/3484* (2013.01); *G01C 21/3492* (2013.01); *G01C 21/3667* (2013.01)

(58) Field of Classification Search
None
See application file for complete search history.

(56) References Cited

U.S. PATENT DOCUMENTS

| | | | |
|---|---|---|---|
| 8,847,791 B1* | 9/2014 | Urbach | G08G 1/0112 340/932.2 |
| 2003/0033080 A1* | 2/2003 | Monde | G01C 21/3461 701/425 |
| 2004/0215389 A1* | 10/2004 | Hirose | G01C 21/3461 701/410 |
| 2005/0222760 A1* | 10/2005 | Cabral | G01C 21/3492 701/423 |
| 2005/0288856 A1* | 12/2005 | Uyeki | G01C 21/3415 701/423 |
| 2010/0312466 A1* | 12/2010 | Katzer | G01C 21/3492 701/533 |
| 2011/0040621 A1* | 2/2011 | Ginsberg | G01C 21/3492 705/14.49 |
| 2011/0184640 A1* | 7/2011 | Coleman | G01C 21/3492 701/533 |
| 2013/0013204 A1* | 1/2013 | Kazama | G01C 21/20 701/533 |
| 2013/0046465 A1* | 2/2013 | Serbanescu | G08G 1/096827 701/527 |

(Continued)

*Primary Examiner* — Navid Ziaeianmehdizadeh
(74) *Attorney, Agent, or Firm* — Crowell & Moring LLP

(57) ABSTRACT

A navigation system includes primary and secondary navigation device, and a server. The secondary navigation device transmits geolocation data to the server. The primary navigation device receives user input indicating a destination. The primary navigation device also determines a current route to the destination based on a current location of the primary navigation device, and transmits the current route to the server. The primary navigation device also receives and displays a difficulty index from the server in response to transmitting the current route. The server determines historical routes reflecting historical commutes based on the geolocation data. The server also determines the difficulty index based on the one or more historical routes and the current route, and transmits the difficulty index to the primary navigation device in response to receiving the current route.

15 Claims, 3 Drawing Sheets

(56) References Cited

U.S. PATENT DOCUMENTS

| | | | | |
|---|---|---|---|---|
| 2013/0103311 A1* | 4/2013 | Yanase | ............... | G01C 21/3453 |
| | | | | 701/527 |
| 2014/0188388 A1* | 7/2014 | Malahy | ................ | G01C 21/367 |
| | | | | 701/533 |
| 2015/0228187 A1* | 8/2015 | Sebastian | ........... | G01C 21/3415 |
| | | | | 701/117 |
| 2016/0284125 A1* | 9/2016 | Bostick | ................ | G06T 19/006 |
| 2016/0334235 A1* | 11/2016 | Gustafson | .......... | G01C 21/3423 |
| 2017/0059345 A1* | 3/2017 | Sugawara | .......... | G01C 21/3492 |
| 2017/0221169 A1* | 8/2017 | Champa | ................. | G01C 21/20 |
| 2017/0292843 A1* | 10/2017 | Wei | .................... | G01C 21/3453 |

* cited by examiner

SYSTEMS AND METHODS FOR RECOGNIZING AND MEASURING HARD-TO-REACH DESTINATIONS

FIELD OF THE INVENTION

The disclosed invention relates to systems and methods for quantifying a difficulty to reach metric for hard-to-reach destinations.

BACKGROUND OF THE INVENTION

The driving experience has been enhanced of late by the use of navigation systems that display driving directions and related maps. These navigation systems thus conveniently assist drivers in traveling to destinations.

This driving experience is, however, often marred by unforeseen delays in travel time. A driver travelling to a given destination may experience frustration at the lack of parking in the vicinity of the destination, or at traffic congestion en route to the destination, or even at the driver's own inability to exactly locate the destination once arriving in the vicinity. Such destinations that require significantly more travel time for the driver to actually reach are sometimes called "hard-to-reach" destinations.

Due to urbanization and the increased number of vehicles on roads, hard-to-reach destinations are increasingly becoming a nuisance for drivers—significantly reducing the driving experience. This phenomenon is not unique to drivers, however, as passengers in public transportation and pedestrians may also experience frustration when attempting to reach hard-to-reach destinations during their own commutes. A pedestrian, for example, may experience frustration at not being able to specifically locate an address due to a lack of appropriate signage, despite his navigation system indicating that he has successfully commuted to the immediate vicinity of the address.

SUMMARY OF THE INVENTION

The present invention provides for a navigation system that is uniquely suited to assist in a user commute to a destination.

The navigation system utilizes historical route information from a plurality of navigation devices to determine the extent that the destination is a hard-to-reach destination, and communicates that determination to the commuter in connection with current route information via the commuter's navigation device. The commuter is thereby better prepared for encountering the hard-to-reach destination, and can plan appropriately.

In particular, one or more secondary navigation devices are configured to transmit geolocation data as a function of time to a server. The geolocation data may be stored by the server on a server database, and is used by the server to generate historical route information for each secondary navigation device. A primary navigation device is configured to receive user input indicating a destination, and to determine a current route corresponding to a current commute based on the destination and a current location of the primary navigation device. The primary navigation unit is also configured to transit the current route to the server. The server is configured to, in response to receiving the current route, determine a difficulty index for the current commute, based on the current route for the primary navigation device and the stored historical routes of the one or more secondary navigation devices, and to transmit the difficulty index to the primary navigation device. The primary navigation device is configured to, thereafter, display the difficulty index to the user in connection with the current route.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

FIG. 1 schematically illustrates the navigation system according to at least one embodiment of the present invention.

DETAILED DESCRIPTION OF THE PREFERRED EMBODIMENTS

Figure 1:
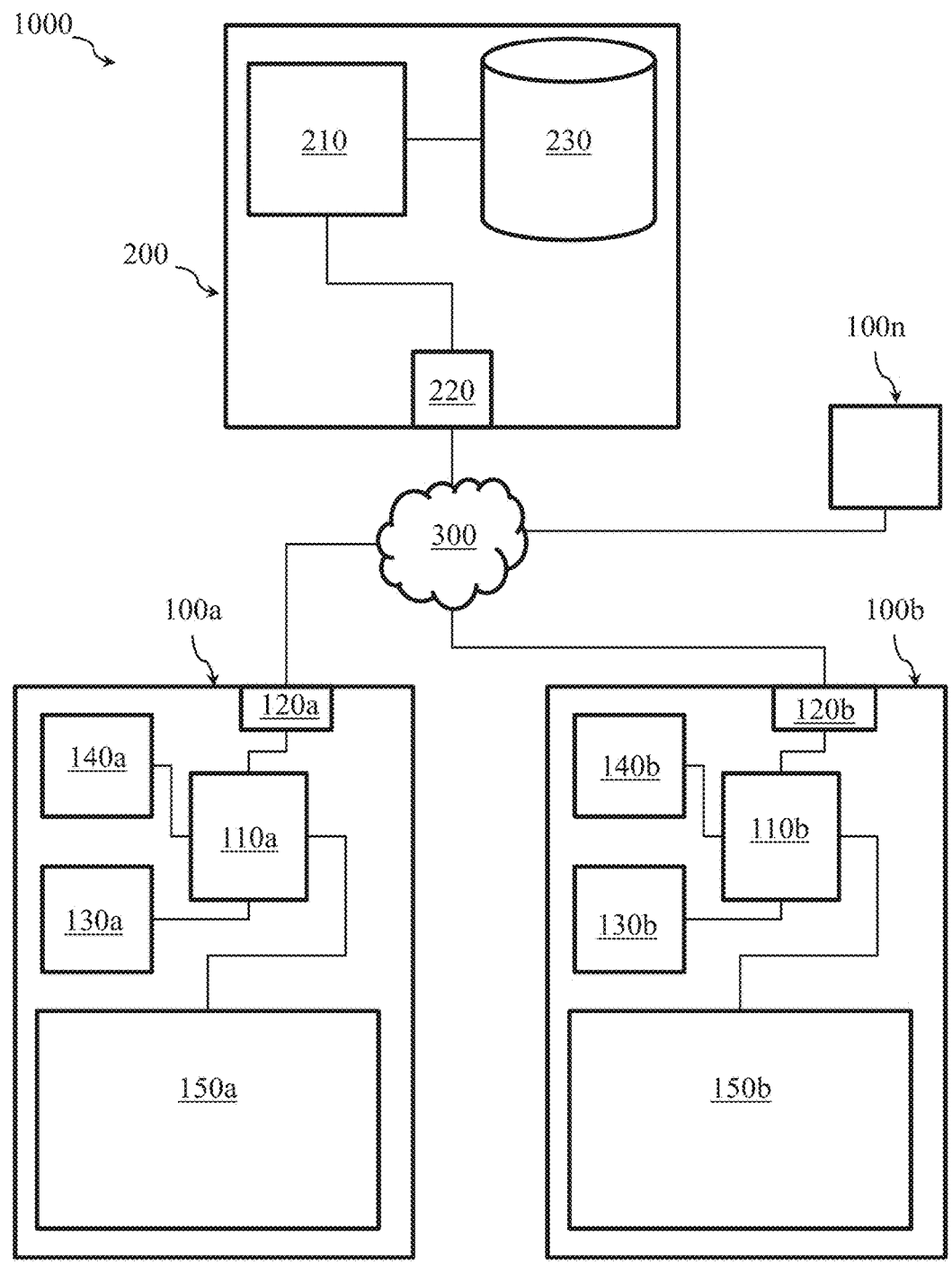

The above described drawing figures illustrate the described invention and method of use in at least one of its preferred, best mode embodiment, which is further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. Therefore, it should be understood that what is illustrated is set forth only for the purposes of example and should not be taken as a limitation on the scope of the present apparatus and its method of use.

FIG. 1 schematically illustrates a navigation system 1000 according to at least one embodiment.

The navigation system 1000 generally comprises a primary navigation device 100a communicatively coupled to one or more secondary navigation devices 100b via server 200. The navigation devices 100a, 100b may be dedicated navigation devices, cellular or smart telephones, vehicle telemetric navigation devices, laptops, portable handheld devices, or any other type of portable electronic device capable of supporting the navigation device functionalities described herein.

The navigation system 1000 is configured to determine and communicate a difficulty index, which indicates a degree of difficulty in commuting from a current location A of the primary navigation device 100a to a destination B, based on historical routes n of the secondary navigation devices and a current route m of the primary navigation device 100a.

The difficulty index reflects the degree of difficulty for reaching the destination due to adverse local conditions. These adverse local conditions may be localized with respect to the destination and/or the current route. For example, the adverse local conditions may include one or more of: absence of parking, lack of destination identifying signage, traffic, road construction, and/or any condition that would cause a detour or delay.

Navigation Devices

The primary navigation device 100a generally comprises a control unit 110a operatively coupled to each of: a wireless device transceiver 120a configured to transmit and receive data via a wireless network 300, a memory 130a configured to retrievably store data, a geolocation unit 140a configured to periodically generate geolocation data indicating the location of the navigation device as a function of time, and a user interface 150a configured to interface with a user to communicate data between the user and the primary navigation device 100a. The control unit 110a is configured control each of the transceiver 120a, the memory, the geolocation unit 140a, and the user interface in accordance with their respective functions, as described herein.

Each of the control unit 110a, the transceiver 120a, the memory, the geolocation unit 140a, and the user interface may be appropriately configured hardware, software and/or firmware. The user interface preferably includes one or more of: a visual display, an audio speaker, a microphone, a graphical user interface, and a tactile user interface.

As shown in FIG. 1, each secondary navigation device 100b comprises similar components to the primary navigation device 100a, which components will not be further discussed with the understanding that their operations are likewise similar. Furthermore, the one or more secondary navigation devices 100b (and their respective components) may, at times, herein be described in the singular for readability. It will be understood, however, that the described invention expressly contemplates several such secondary navigation devices 100b-n.

Server

The server 200 generally comprises a processor 210 operatively coupled to each of: a server transceiver 220 configured to transmit and receive data via the wireless network, and a database 230 configured to retrievably store data. The processor 210 is configured control each of the server transceiver 220, and the database 230 in accordance with their respective functions, as described herein.

Operations

With respect to the operation of the primary navigation device 100a, the user interface receives user input from the user identifying the destination. The user input is communicated to the geolocation unit 140a, which generates geolocation data according to the destination. The geolocation unit 140a also generates geolocation data according to the current location of the primary navigation device 100a. The geolocation unit 140a still further generates the current route, via techniques known to those skilled in the art, based on stored map data, the current location and the destination.

The transceiver 120a transmits the current route (which includes the current position and the destination) to the server, and receives the difficulty index from the server 200 in response. The difficulty index may then be communicated to the user interface, which in turn communicates the difficulty index to the user in association with the current route and/or the destination.

The control unit 110a may check the difficulty index against difficulty ranges stored in the memory 130a and provide a corresponding proxy to the user interface in lieu of the difficulty index. For example, a difficulty index of around 1.0 may correspond to the proxy: normal or good, while a difficulty index significantly above 1.0 may correspond to the proxy: poor. A difficulty index less than 1.0 may also correspond to the proxy: normal or good, and may indicate the destination is easier to reach than expected. The difficulty ranges may be preset, or may vary dynamically in accordance with an operative area 302, described further herein.

With respect to the operation of the secondary navigation devices 100b, the geolocation units 140b periodically generate geolocation data indicating the location of the secondary navigation device 100b as a function of time. The geolocation data is communicated to the device transceiver 120b, which transmits the geolocation data to the server 200.

With respect to the operation of the server, the server transceiver 220 receives the geolocation data from the secondary navigation devices 100b. The geolocation data is communicated to the database 230 where it is stored. Storage of the geolocation data may include indexing the geolocation data according to the secondary navigation device 100b it relates to.

The processor 210 determines the historical routes of the secondary navigation devices 100b based on their respective geolocation data stored in the database. These determined historical routes are communicated to the database 230 and retrievably stored therein.

In at least one embodiment, the processor 210 determines the historical routes by identifying geolocation data that is bounded by idle periods (i.e., periods exceeding a predefined duration where the change in the location of the device is below a minimum threshold). These idle periods indicate that the device is not involved in a commute. The geolocation data bounded by these idle periods reflects a historical route. The beginning of an idle period reflects the end of a route; the end of an idle period reflects the beginning of a route.

The server transceiver 220 also receives the current route (which includes the current position and the destination) from the primary navigation device 100a. In response to the server 200 receiving the current route, the processor 210 determines the difficulty index based on the current route of the primary navigation device 100a and one or more historical routes of the secondary navigation devices 100b. The difficulty index is then transmitted via the server transceiver 220 to the primary navigation device 100a.

Figure 2:
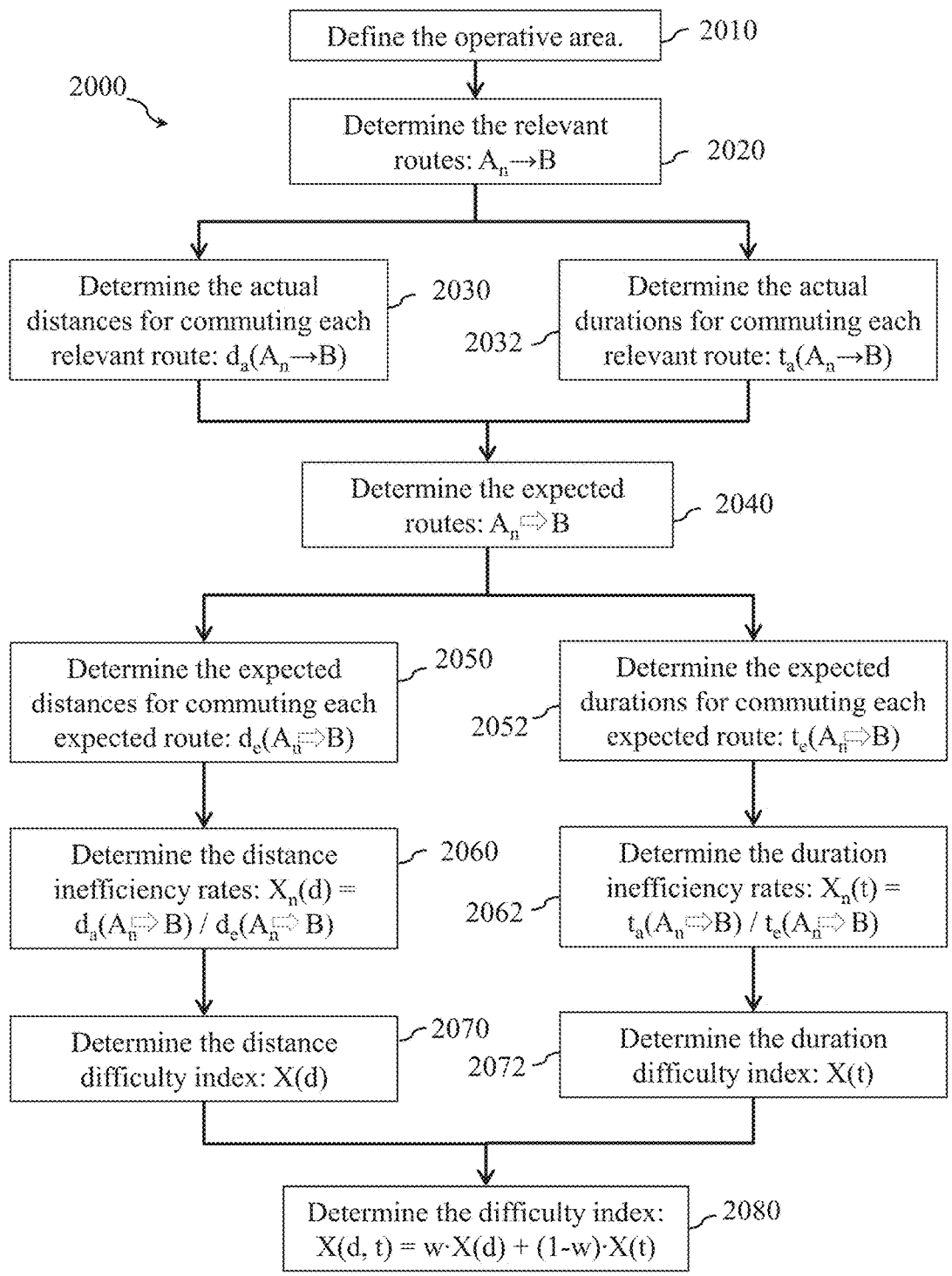
FIG. 2 is a representative flowchart illustrating the process for determining the difficulty index according to at least one embodiment of the present invention.

FIG. 2 illustrates an exemplary process 2000 for determining the difficulty index according to at least one embodiment.

At Step 2010, the server 200 defines the operative area 302. The operative area 302 is an area for which adverse localized conditions are likely to affect the degree of difficulty for reaching the destination.

Figure 3:
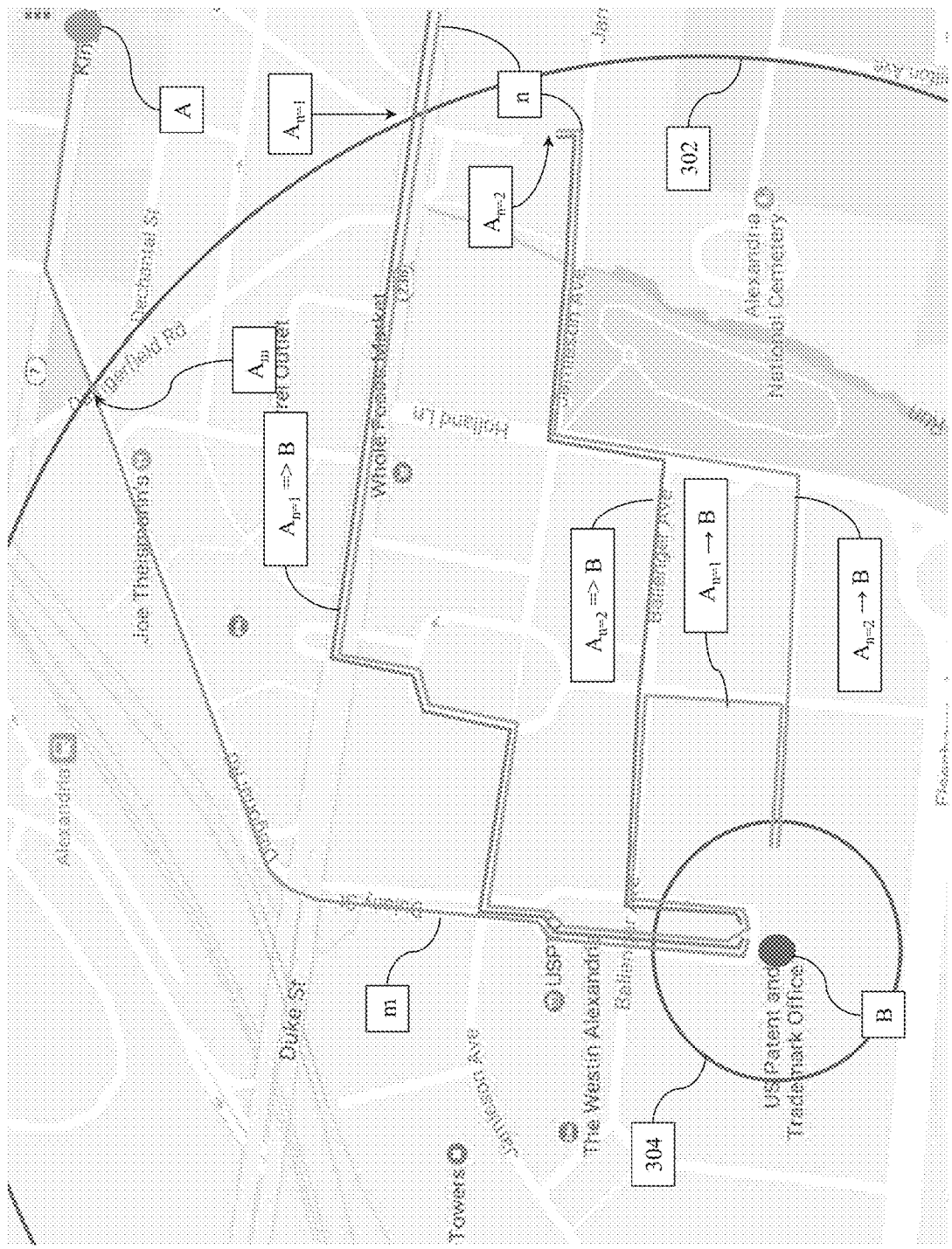
FIG. 3 is a representative map illustrating aspects of exemplary routes according to at least one embodiment of the present invention.

The operative area 302 may be defined with respect to the destination, as for example, the area within a predetermined distance of the destination, shown for example in FIG. 3. The operative area 302 may also, or alternatively, be defined with respect to the current route, as for example, the area within a predetermined distance from the current route.

Returning to FIG. 2, at Step 2020, the server 200 determines one or more relevant routes of the one or more secondary navigation devices 100b. The relevant routes may be represented symbolically as:

$$A_n \rightarrow B,$$

where $A_n$ represents the start point of the historical route n, and B represents the destination. In other words, the relevant routes are respective historical routes of the secondary navigation devices 100b that end at the destination and initially overlap the operative area 302 at respective start points.

In some embodiments, the destination comprises destination radius 304 whereby, if the historical route ends within the destination radius, the historical route is considered to end at the destination. This is shown, for example, in FIG. 3, which also illustrates several exemplary relevant routes. For example, relevant route $A_1 \rightarrow B$ reflects a portion of historical route n=1 that initially overlaps the operative area 302 at the start point $A_1$ and ends at the destination B. Relevant route $A_2 \rightarrow B$ reflects the entirety of historical route n=2 that initially overlaps the operative area 302 at the start point $A_2$ and ends at the destination B.

At Step 2030, the server 200 also determines an actual distance for commuting each relevant route (i.e., actual distance for each historical commute of the relevant route). This determination may be represented symbolically by:

$$d_a(A_n \rightarrow B),$$

where $d_a(A_n \rightarrow B)$ represents the actual distance travelled along the relevant route that corresponds to historical route n, from the start point $A_n$ to the destination B.

The server 200 also, at Step 2032, determines an actual duration for each relevant route (i.e., actual duration for each historical commute of the relevant route). This determination may be represented symbolically by:

$$t_a(A_n \rightarrow B),$$

where $t_a(A_n \rightarrow B)$ represents the actual duration spent traveling along the relevant route that corresponds to historical route n, from the start point $A_n$ to the destination B.

While the server 200 determines the actual distances and durations, the relevant routes from which these quantities are determined often include additional travelling due to adverse local conditions (e.g., absence of parking, lack of destination identifying signage, traffic, road construction, or any condition that would cause a detour or delay). For example, as shown for example in the relevant routes of FIG. 3, where parking near the destination is difficult to find, the relevant routes may meander near the destination for a time before ending. The resultant actual distance and/or duration travelled will consequently include additional distance and/or duration due to the adverse local condition. That additional distance and/or duration may be identified by the server 200 and used to generate the difficulty index.

The server 200 therefore also determines expected distances and durations for travelling between the start point $A_n$ and the destination B, for reach $A_n$ corresponding to a relevant route.

Returning to FIG. 2, this may involve the server 200 determining, at Step 2040, one or more expected routes corresponding to each start point $A_n$. The expected routes may be represented symbolically as:

$$A_n \Rightarrow B,$$

where $A_n$ represents the start point corresponding to the relevant route $A_n \rightarrow B$.

The expected route is the route one would expect to travel from the start point to the destination in the absence of adverse local conditions (e.g., absence of parking, lack of destination identifying signage, traffic, road construction, or any condition that would cause a detour or delay). The expected route is therefore preferably the shortest route—in terms of distance, duration or a combination of both—from the start point to the destination. The expected route may be determined via techniques known to those skilled in the art, based on stored map data, the start point of the relevant route and the destination.

Several expected routes are illustrated in FIG. 3. For example, both of expected routes $A_1 \Rightarrow B$ and $A_2 \Rightarrow B$ reflect expected routes corresponding relevant routes $A_1 \rightarrow B$ and $A_2 \rightarrow B$.

Returning to FIG. 2, at Step 2050, the server 200 determines an expected distance for commuting each expected route. This determination may be represented symbolically by:

$$d_e(A_n \Rightarrow B),$$

where $d_e(A_n \Rightarrow B)$ represents the expected distance to be travelled from the start point $A_n$ to the destination B. In other words, the expected distance is the distance of the expected route.

The expected distance therefore reflects the distance one would expect to travel from the start point to the destination (i.e., an expected commute) in the absence of adverse local conditions (e.g., absence of parking, lack of destination identifying signage, traffic, road construction, or any condition that would cause a detour or delay). The expected distance is preferably a minimum distance necessary to travel from the start point to the destination.

The server 200 also determines, at Step 2052, an expected duration for commuting each expected route. This determination may be represented symbolically by:

$$t_e(A_n \Rightarrow B),$$

where $t_e(A_n \rightarrow B)$ represents the expected distance to be travelled from the start point $A_n$ to the destination B. In other words, the expected distance is the distance of the expected route.

The expected duration therefore reflects the duration one would expect to spend travelling from the start point to the destination (i.e., the expected commute) in the absence of adverse local conditions (e.g., absence of parking, lack of destination identifying signage, traffic, road construction, or any condition that would cause a detour or delay). The expected duration is preferably a minimum duration necessary to travel from the start point to the destination.

At Step 2060, the server 200 determines a distance inefficiency rate $X_n(d)$ for each relevant route, based on the distance inefficiency factor and the expected distance for the relevant route. This determination may be represented mathematically as:

$$X_n(d) = d_a(A_n \Rightarrow B)/d_e(A_n \Rightarrow B)),$$

where $X_n(d)$ represents the distance inefficiency rate for the relevant route corresponding to historical route n.

In other words, the distance inefficiency rate reflects how distance inefficient the relevant route was compared to the expected route due to additional distance actually travelled by the secondary navigation device 100b. For example, if the expected distance is 2.0 miles and the actual distance is 2.5 miles, then the distance inefficiency rate would be 1.25. This indicates that an additional 0.25 times the expected distance was travelled via the actual route. The additional distance may be due to, for example, adverse local conditions (e.g., absence of parking, lack of destination identifying signage, traffic, road construction, or any other condition that would cause a detour or delay).

At Step 2062, the server 200 determines a duration inefficiency rate $X_n(t)$ for each relevant route, based on the duration inefficiency factor and the expected duration for the relevant route. This determination may be represented mathematically as:

$$X_n(t) = t_a(A_n \Rightarrow B)/t_e(A_n \Rightarrow B)),$$

where $X_n(d)$ represents the duration inefficiency rate for the relevant route corresponding to historical route n.

In other words, the duration inefficiency rate reflects how duration inefficient the relevant route was compared to the expected route due to additional time spent actually traveling by the secondary navigation device 100*b*. For example, if the expected duration is 10 minutes and the actual duration is 15 minutes, then the duration inefficiency rate would be 1.5. This indicates that an additional 0.5 times the expected duration was travelled via the actual route. The additional time spent travelling may be due to, for example, adverse local conditions (e.g., absence of parking, lack of destination identifying signage, traffic, road construction, or any other condition that would cause a detour or delay).

At Steps 2070 and 2072, the server 200 determines a distance difficulty index X(d), based on the distance inefficiency rate of each relevant route, and a duration difficulty index X(t), based on the duration inefficiency rate of each relevant route, respectively. The difficulty indices are estimates of, overall, how inefficient the relevant routes were compared to their corresponding expected routes. The greater the difficulty index is in excess of 1.0, the more difficult it is to reach the destination. A distance difficulty index significantly greater than 1.0 may indicate, for example, detours or other route concerns. A duration index significantly greater than 1.0 may indicate, for example, traffic or parking concerns. Difficulty indexes approximately equal to or less than 1.0 may indicate, for example, that the routes were shorter or were traversed faster than expected, respectively.

In some embodiments, the difficulty index for distance and/or duration may be determined via a simple average of the inefficiency rates. In other embodiments, the difficulty indices may be determined via a weighted average. Accordingly, weight factors may be assigned to each of the respective inefficiency rates in accordance with characteristics of the respective relevant route. For example, some relevant routes may be assigned more weight than other relevant routes due to similarities with the current route. For example, relevant routes whose start points $A_n$ are closer in proximity to a start point of the current route $A_m$ (i.e. where the current route initially overlaps the operative area) may be weighted more heavily. Other circumstances that may influence weighting include, times of day, traffic conditions, times of the year, weather conditions, or any other circumstance that would tend to influence efficiency.

A difficulty index is determined by the server, at Step 2080, based on one or more of the distance difficulty index and the duration difficulty index. The difficulty index is preferably determined via employing a weighted average technique. This determination may be represented mathematically as:

$$X(d,t)=w \cdot X(d)+(1-w) \cdot X(t),$$

where w is a predetermined weight factor such that 0≤w≤1.

Accordingly, in some embodiments, the difficulty index may be the distance difficulty index, or the duration difficulty index, alone. It will be understood that in such embodiments, unnecessary determinations need not be made.

While the exemplary process for determining the difficulty index is described herein with respect to the server, part or all of the processes may be accomplished via the primary navigation device 100*a*, according to the principles described herein. In particular, the processes performed by the server processor 210 may be likewise performed by the control unit 110*a* of the primary navigation device 100*a* interacting with the database 230 via the transceivers.

In addition, while the exemplary process is described as determining difficulty index for the current route of the primary navigation device 100*a* based on the historical routes of the secondary navigation devices 100*b*, the historical routes may also include historical routes of the primary navigation device 100*a*. In particular, the primary navigation device 100*a* would, in such embodiments, be configured to provide the functions of both the primary navigation device 100*a* and the secondary navigation devices 100*b*.

The enablements described in detail above are considered novel over the prior art of record and are considered critical to the operation of at least one aspect of the invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium, as is known in the art. Further, modules and/or other appropriate means for performing the operations described herein may be utilized in implementing the functionalities described herein.

The scope of this description is to be interpreted only in conjunction with the appended claims and it is made clear, here, that the named inventor believes that the claimed subject matter is what is intended to be patented.

What is claimed is:

1. A method for improving a current commute to a destination, the method comprising:
storing geolocation data of a plurality of navigation devices in a database;
determining a plurality of historical routes based on the geolocation data stored in the database, wherein each historical route is a route traveled by at least one of the plurality of navigation devices during a corresponding historical commute to the destination prior to the current commute;
providing navigational guidance for the current commute, via a primary navigation device, to the destination from a current location along a current route different from at least one of the historical routes;
determining a difficultly index for the destination, wherein the difficulty index is determined based on the current route to the destination and the historical routes commutes, and wherein the difficulty index is determined by:
calculating duration and/or distance inefficiencies for each historical commute along the corresponding historical route, and
aggregating the duration inefficiencies and distance inefficiencies of each historical commute;
associating the difficulty index with the destination; and
communicating the difficulty index, via a user interface of the primary navigation device, to a user in connection with providing the navigational guidance to the destination along the current route,
wherein the difficulty index indicates a degree of difficulty of reaching the destination.

2. The method of claim 1, wherein determining the difficulty index includes, for each historical commute, comparing a relevant portion of the historical commute along the corresponding historical route to an expected commute along the corresponding historical route, wherein the relevant portion and the expected commute share starting points.

3. The method of claim 2, wherein the shared starting point for the relevant portion corresponds to a location where the historical route initially coincides with an operative area.

4. The method of claim 3, wherein the operative area is defined by a radial distance from the destination.

5. The method of claim 3, wherein the operative area is defined by a distance from the current route.

6. The method of claim 2, wherein comparing, for each historical route, the relevant portion of the historical commute to the expected commute includes comparing one or more of: an actual distance of the historical commute to an expected distance of the expected commute, and an actual duration of the historical commute to an expected duration of the expected commute.

7. The method of claim 1, wherein the difficulty index reflects operative area conditions influencing the one or more historical commutes, the operative area conditions including one or more of: an absence of parking, a lack of appropriate destination identifying signage, traffic, route construction, one or more detours and one or more delays.

8. A navigation system, comprising:
a secondary navigation device configured to transmit geolocation data to a server;
a primary navigation device configured to:
receive user input indicating a destination,
determine, during a current commute, a current route to the destination based on a current location of the primary navigation device,
provide navigational guidance for the current commute to the destination from the current location along the current route different from at least one historical route of a plurality of historical routes,
transmit the current route to the server,
receive a difficulty index in response to transmitting the current route,
display the difficulty index in connection with providing the navigational guidance to the destination along the current route;
the server configured to:
determine the plurality of historical routes based on the geolocation data received from the secondary navigation device, wherein each historical is a route traveled by the secondary navigation device during a corresponding historical commute by the secondary navigation device to the destination prior to the current commute;
determine the difficulty index for the destination, wherein the difficulty index is determined based on the historical routes commutes and the current route received from the primary navigation device, and wherein the difficulty index is determined by:
calculating duration and/or distance inefficiencies for each historical commute along the corresponding historical route, and
aggregating the duration inefficiencies and distance inefficiencies of each historical commute;
associate the difficulty index with the destination; and
transmit the difficulty index to the primary navigation device in response to receiving the current route,
wherein the difficulty index indicates an estimated degree of difficulty of reaching the destination based on inefficient historical commutes.

9. The navigation system of claim 8, wherein the server is further configured to determine the difficulty index by, for each historical commute, comparing a relevant portion of the historical commute to an expected commute, wherein the relevant portion and the expected commute share starting points.

10. The navigation system of claim 9, wherein the shared starting point for the relevant portion corresponds to a location where the historical route initially coincides with an operative area.

11. The navigation system of claim 10, wherein the operative area is defined by a radial distance from the destination.

12. The navigation system of claim 10, wherein the operative area is defined by a distance from the current route.

13. The navigation system of claim 9, wherein the server is further configured to compare, for each historical route, the relevant portion of the historical commute to the expected commute by comparing one or more of: an actual distance of the historical commute to an expected distance of the expected commute, and an actual duration of the historical commute to an expected duration of the expected commute.

14. The navigation system of claim 8, wherein the server is further configured to retrievably store at least one of: the geolocation data, and the historical route, in a database.

15. A navigation device for assisting a current commute, the navigation device comprising: a geolocation unit, a transceiver, a user interface, and a control unit configured to control:
- the geolocation unit such that the geolocation unit determines a current route to a destination based on a current location of the primary navigation device,
- the transceiver such that the transceiver:
- transmits the current route in response to user input indicating the destination, and
- receives a difficulty index corresponding to the current route in response, the difficulty index being determined based on the current route and one or more historical routes reflecting prior commutes of other navigation devices to the destination, the difficulty index being determined by:
- calculating duration and/or distance inefficiencies for each historical commute along the corresponding historical route, and
- aggregating the duration inefficiencies and distance inefficiencies of each historical commute;
- the user interface to receive the user input, and to display the difficulty index in association with current route.

\* \* \* \* \*